(12) United States Patent
Fanning et al.

(10) Patent No.: US 11,815,099 B2
(45) Date of Patent: Nov. 14, 2023

(54) FAN ASSEMBLY

(71) Applicant: Dyson Technology Limited, Wiltshire (GB)

(72) Inventors: Eoin Vincent Fanning, Dublin (IE); Timothy Neil Jukes, Swindon (GB)

(73) Assignee: Dyson Technology Limited, Malmesbury (GB)

( * ) Notice: Subject to any disclaimer, the term of this patent is extended or adjusted under 35 U.S.C. 154(b) by 0 days.

(21) Appl. No.: 17/769,202

(22) PCT Filed: Sep. 16, 2020

(86) PCT No.: PCT/GB2020/052231
§ 371 (c)(1),
(2) Date: Apr. 14, 2022

(87) PCT Pub. No.: WO2021/074576
PCT Pub. Date: Apr. 22, 2021

(65) Prior Publication Data
US 2023/0125958 A1    Apr. 27, 2023

(30) Foreign Application Priority Data
Oct. 17, 2019  (GB) ..................................... 1915017

(51) Int. Cl.
*F04D 25/10*    (2006.01)
*F04D 27/00*    (2006.01)

(52) U.S. Cl.
CPC ......... *F04D 25/105* (2013.01); *F04D 27/004* (2013.01); *F05D 2270/02* (2013.01)

(58) Field of Classification Search
CPC ... F04D 25/105; F04D 27/004; F05D 2270/02
See application file for complete search history.

(56) References Cited

U.S. PATENT DOCUMENTS

| 5,180,333 A | 1/1993 | Shyu |
| 7,347,669 B1 | 3/2008 | Patrick et al. |
| 9,593,864 B2 | 3/2017 | Yasutomi et al. |

(Continued)

FOREIGN PATENT DOCUMENTS

| CN | 1283770 A | 2/2001 |
| CN | 201382005 Y | 1/2010 |

(Continued)

OTHER PUBLICATIONS

Translation of JPS63-154893 (Year: 1988).*

(Continued)

*Primary Examiner* — Brian O Peters
(74) *Attorney, Agent, or Firm* — Faegre Drinker Biddle & Reath LLP

(57) ABSTRACT

A fan assembly including a base arranged to support the fan assembly on a surface, an air flow generator that is arranged to generate an air flow, and an air outlet that is arranged to emit at least a portion of the air flow from the fan assembly is provided. The air outlet is arranged to be oscillated relative to the base. The fan assembly further includes a controller that is arranged to control the oscillation of the air outlet relative to the base. The controller is arranged to vary an oscillation speed of the air outlet for each oscillation.

16 Claims, 7 Drawing Sheets

(56) References Cited

U.S. PATENT DOCUMENTS

| | | | |
|---|---|---|---|
| 10,054,128 | B2 | 8/2018 | Furuhashi et al. |
| 2011/0070084 | A1 | 3/2011 | Kuang |
| 2015/0017028 | A1 | 1/2015 | Hodgson et al. |

FOREIGN PATENT DOCUMENTS

| | | | |
|---|---|---|---|
| CN | 203240666 U | | 10/2013 |
| CN | 203641061 U | | 6/2014 |
| CN | 104005971 A | | 8/2014 |
| CN | 104279145 A | | 1/2015 |
| CN | 104697124 A | | 6/2015 |
| CN | 205066084 U | | 3/2016 |
| CN | 105650019 A | | 6/2016 |
| CN | 106286408 A | | 1/2017 |
| CN | 205937177 U | | 2/2017 |
| CN | 107152764 A | | 9/2017 |
| CN | 107314497 A | | 11/2017 |
| CN | 107420289 A | | 12/2017 |
| CN | 208518942 U | | 2/2019 |
| CN | 208518944 U | | 2/2019 |
| CN | 214742400 U | | 11/2021 |
| EP | 2918930 A1 | | 9/2015 |
| EP | 3019752 A2 | | 5/2016 |
| JP | 63-154893 A | | 6/1988 |
| JP | S63-154893 | * | 6/1988 |
| JP | 06-117657 A | | 4/1994 |
| JP | 06-117684 A | | 4/1994 |
| JP | 2001-108280 A | | 4/2001 |
| JP | 2006-258402 A | | 9/2006 |
| JP | 2012-117418 A | | 6/2012 |
| JP | 2015-017610 A | | 1/2015 |
| JP | 5660084 B2 | | 1/2015 |
| JP | 5787841 B2 | | 9/2015 |
| JP | 5828134 B2 | | 12/2015 |
| JP | 5879502 B2 | | 3/2016 |
| JP | 6053659 B2 | | 12/2016 |
| JP | 2017-067064 A | | 4/2017 |
| JP | 2018-017240 A | | 2/2018 |
| JP | 6543809 B2 | | 7/2019 |
| KR | 20-0162287 Y1 | | 12/1999 |
| KR | 10-2016-0020551 A | | 2/2016 |
| WO | 2008/014641 A1 | | 2/2008 |
| WO | 2013/035271 A1 | | 3/2013 |
| WO | 2015/004418 A2 | | 1/2015 |
| WO | 2021/074576 A1 | | 4/2021 |

OTHER PUBLICATIONS

International Search Report and Written Opinion received for PCT Patent Application No. PCT/GB2020/052231, dated Dec. 17, 2020, 11 pages.

Office Action received for Great Britain Patent Application No. 1915017.6, dated Dec. 9, 2021, 2 pages.

Search Report received for Great Britain Patent Application No. 1915017.6, dated Mar. 4, 2020, 1 page.

Office Action received for Chinese Patent Application No. 202011107941 7, dated Jun. 6, 2022, 21 pages (11 pages of English Translation and 10 pages of Original Document).

Office Action received for Japanese Patent Application No. 2022-522977, dated Jun. 6, 2023, 7 pages (4 pages of English Translation and 3 pages of Original Document).

Office Action received for Korean Patent Application No. 10-2022-7016431, dated Aug. 12, 2023, 11 pages (5 pages of English Translation and 6 pages of Original Document).

* cited by examiner

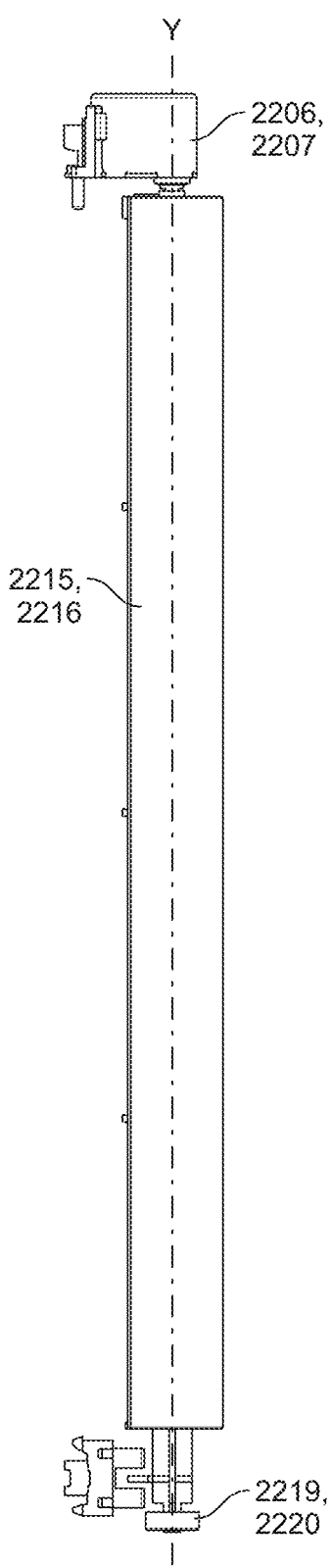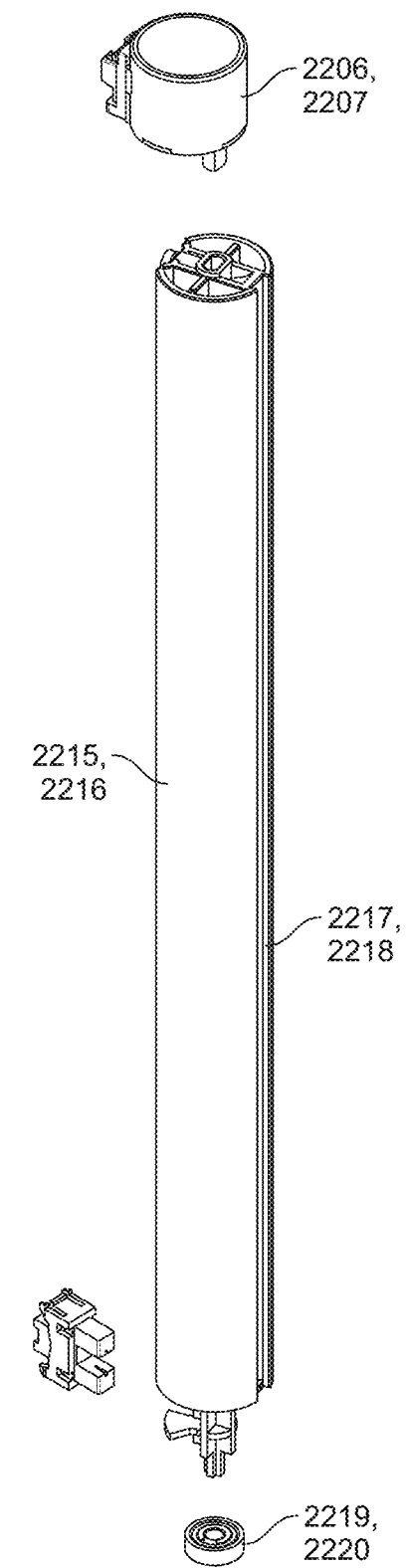
FIG. 9
FIG. 10

FAN ASSEMBLY

CROSS-REFERENCE TO PRIOR APPLICATION

This application is a § 371 National Stage Application of PCT International Application No. PCT/GB2020/052231 filed Sep. 16, 2020, which claims the priority of United Kingdom Application No. 1915017.6, filed Oct. 17, 2019, each of which are herein incorporated by reference in their entirety.

FIELD OF THE INVENTION

The present invention relates to a fan assembly.

BACKGROUND OF THE INVENTION

Conventional domestic fans that are used for the purposes of thermal comfort and/or environmental or climate control typically generate relatively steady air flows. However, thermal comfort research has shown that a natural wind or breeze can lead to greater cooling sensation than these steady artificial air flows. In particular, both field studies and controlled experiments have suggested that a natural breeze can generate a greater thermal response or sensation in humans when compared to constant air flows.

It is therefore desirable to provide a fan assembly that can generate air flows that replicate the flow characteristics of a natural wind and that may therefore be perceived as providing a more comfortable cooling sensation than that provided by a steady artificial air flow. However, trying to simulate natural outdoor air flows in indoor environments is a difficult task, given the apparent chaotic or unsteady nature of the wind and the scale of its fluid mechanisms.

SUMMARY OF THE INVENTION

It is an object of the present invention to provide a fan assembly that is capable of generating air flows that replicate the flow characteristics of a natural wind and that may therefore be perceived as providing enhanced thermal comfort for users. The present inventors therefore used turbulent statistical methods to develop a profile of the wind at the typical height of a human, and identified several characteristics that are representative of natural wind at such heights. The present inventors then determined that it is difficult to produce an airflow having characteristics that correspond with those determined for natural wind using conventional oscillation methodologies. However, the present inventors then found that an air flow may be oscillated aperiodically in such a way that it can realistically simulate the identified characteristics of natural wind over frequency ranges that are relevant to humans. In particular, the present inventors have found that the identified characteristics of natural wind can be replicated by a fan assembly that is capable of oscillating an air outlet at an oscillation speed that varies for each oscillation.

According to a first aspect there is provided a fan assembly comprising a base arranged to support the fan assembly on a surface, an air flow generator that is arranged to generate an air flow, and an air outlet that is arranged to emit at least a portion of the air flow from the fan assembly, wherein the air outlet is arranged to be oscillated relative to the base. The fan assembly further comprises a controller that is arranged to control the oscillation of the air outlet relative to the base, wherein the controller is arranged to vary an oscillation speed of the air outlet for each oscillation.

The controller may be arranged to randomly vary the oscillation speed. The controller may be arranged to randomly select the oscillation speed used for each oscillation. The controller may be arranged to randomly select the oscillation speed used for each oscillation from within a range of oscillation speeds. The controller may be arranged to randomly select the oscillation speed from between an upper speed limit and a lower speed limit. The controller may be arranged to randomly select the oscillation speed used for each oscillation from a plurality oscillation speeds that are evenly distributed from a lower speed limit to an upper speed limit.

The controller may be further arranged to vary an oscillation magnitude of the air outlet for each oscillation. The controller may be arranged to randomly vary the oscillation magnitude. The controller may be arranged to randomly select the oscillation magnitude used for each oscillation. The controller may be arranged to randomly select the oscillation magnitude used for each oscillation from within a range of oscillation. The controller may be arranged to randomly select the oscillation magnitude from between an upper oscillation limit and a lower oscillation limit. The controller may be arranged to randomly select the oscillation magnitude used for each oscillation from a plurality oscillation magnitudes that are evenly distributed from an upper oscillation limit to a lower oscillation limit.

The controller may be configured with a plurality of oscillation modes, and the controller may then be arranged to vary an oscillation speed of the air outlet for each oscillation when in at least one of the plurality of oscillation modes. The controller may be arranged to vary both an oscillation speed and an oscillation magnitude of the air outlet for each oscillation when in at least one other of the plurality of oscillation modes. The controller may be arranged to maintain the oscillation speed of the air outlet for each oscillation (i.e. to use a single, constant oscillation speed for each oscillation) when in at least one other of the plurality of oscillation modes. The controller may be arranged to keep the air outlet stationary when in at least one other of the plurality of oscillation modes.

The controller may be configured with a first oscillation mode and a second oscillation mode, the first oscillation mode being different to the second oscillation mode, and the controller may then be arranged to vary an oscillation speed of the air outlet for each oscillation when in the first oscillation mode. The controller may then be arranged to maintain the oscillation speed of the air outlet for each oscillation (i.e. to use a single, constant oscillation speed for each oscillation) when in the second oscillation. The controller may configured with a third oscillation mode, and my then then be arranged to keep the air outlet stationary when in the third oscillation mode. The controller may configured with a fourth oscillation mode, and my then then be arranged to vary both an oscillation speed and an oscillation magnitude of the air outlet for each oscillation.

The fan assembly may comprise a nozzle, the air outlet being provided on the nozzle. The fan body may house the air flow generator and comprise an air inlet through which the air flow is drawn into the body by the air flow generator and an air outlet downstream of the air flow generator for emitting the air flow from the body. The nozzle may then be mounted on the body over the air outlet. The nozzle may then be arranged to receive the air flow exhausted from the air outlet of the body.

The nozzle may comprise a nozzle body that is fixed relative to the base, and the air outlet may then be arranged to be oscillated relative to nozzle body. The fan assembly may comprise a fan body, with the nozzle then being mounted to the fan body. The nozzle may then be arranged to be oscillated relative to the base such that air outlet oscillates relative to the base. The fan body may be fixedly mounted to the base and the nozzle may then be arranged to be oscillated relative to the fan body such that air outlet oscillates relative to the base. Alternatively, the fan body may comprise the base and the nozzle may then be arranged to be oscillated relative to the fan body such that air outlet oscillates relative to the base. The nozzle may be fixed relative to the fan body, and the fan body may then be arranged to be oscillated relative to the base such that air outlet oscillates relative to the base.

The fan assembly may comprise two or more air outlets, and the two or more air outlets may then be arranged to be independently oscillated relative to the base. The controller may be arranged to independently vary an oscillation speed of each of the two or more air outlets for each oscillation. The controller may be arranged to ensure that, for each oscillation, the oscillation speed of each of the two or more air outlets differs from that of the other of the two or more air outlets.

The fan assembly may comprise a further air outlet that is arranged to emit at least a portion of the air flow from the fan assembly, wherein the further air outlet is arranged to be oscillated relative to the base and the controller is arranged to control the oscillation of the further air outlet relative to the base. The controller may be arranged to independently vary an oscillation speed of both the air outlet and the further air outlet for each oscillation. The controller may be arranged to ensure that, for each oscillation, the oscillation speed of the air outlet differs from that of the further air outlet.

There is also provided a fan assembly comprising a base arranged to support the fan assembly on a surface, an air flow generator that is arranged to generate an air flow, and one or more air outlets that are each arranged to emit at least a portion of the air flow from the fan assembly, wherein the one or more air outlets are arranged to be oscillated relative to the base. The fan assembly further comprises a controller that is arranged to control the oscillation of the one or more air outlets relative to the base, wherein the controller is arranged to vary an oscillation speed of the one or more air outlets for each oscillation. The fan assembly may comprise two or more air outlets that are arranged to be independently oscillated relative to the base, and the controller may then be arranged to independently vary an oscillation speed of the two or more air outlets for each oscillation.

There is also provided a fan assembly comprising a base arranged to support the fan assembly on a surface, an air flow generator that is arranged to generate an air flow, and two or more air outlets that are each arranged to emit at least a portion of the air flow from the fan assembly, wherein the two or more air outlets are arranged to be independently oscillated relative to the base. The fan assembly further comprises a controller that is arranged to control the oscillation of each of the two or more air outlets relative to the base, wherein the controller is arranged to independently vary an oscillation speed of each of the two or more air outlets for each oscillation.

There is also provided a fan assembly comprising a base arranged to support the fan assembly on a surface, an air flow generator that is arranged to generate an air flow, a first air outlet and a second air outlet that are each arranged to emit at least a portion of the air flow from the fan assembly, wherein the first and second air outlets are arranged to be independently oscillated relative to the base. The fan assembly further comprises a controller that is arranged to control the oscillation of each of the first and second air outlets relative to the base, wherein the controller is arranged to independently vary an oscillation speed of each of the first and second air outlets for each oscillation.

BRIEF DESCRIPTION OF THE INVENTION

An embodiment of the present invention will now be described, by way of example only, with reference to the accompanying drawings, in which:

FIG. 9 is a side view of a further embodiment of an oscillation mechanism; and

FIG. 10 is an exploded view of the oscillation mechanism of FIG. 9.

DETAILED DESCRIPTION OF THE INVENTION

Figure 2:
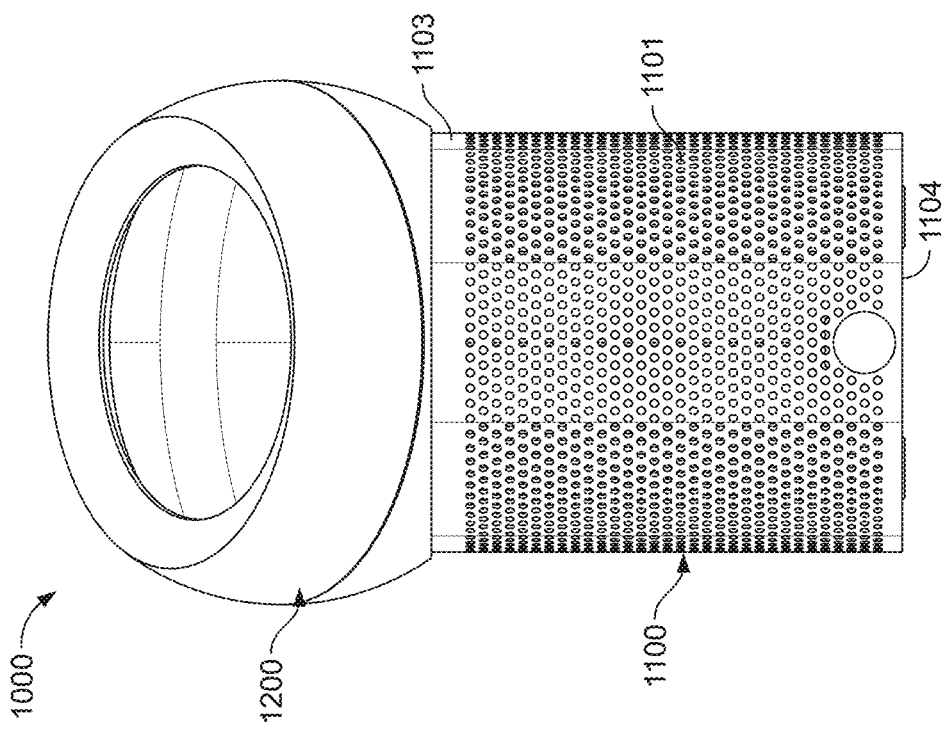
FIG. 2 is a front view of the fan assembly of FIG. 1.

There will now be described a fan assembly comprising a nozzle that is capable of generating air flows that replicate the flow characteristics of a natural wind and that may therefore be perceived as providing enhanced thermal comfort for users. The term "fan assembly" as used herein refers to a fan assembly configured to generate and deliver an air flow for the purposes of thermal comfort and/or environmental or climate control. Such a fan assembly may be capable of generating one or more of a dehumidified air flow, a humidified air flow, a purified air flow, a filtered air flow, a cooled air flow, and a heated air flow.

The fan assembly comprises a base arranged to support the fan assembly on a surface, an air flow generator that is arranged to generate an air flow, and an air outlet that is arranged to emit at least a portion of the air flow from the fan assembly, wherein the air outlet is arranged to be oscillated relative to the base. The fan assembly further comprises a controller that is arranged to control the oscillation of the air outlet relative to the base, and the controller is arranged to vary an oscillation speed of the air outlet for each oscillation.

The term "oscillation" as used herein refers to movement that repeatedly switches between movement in a first direction to movement in an opposite, second direction. In particular, whilst oscillation may involve movement back and forth between two fixed end points and/or around a fixed central point, the term "oscillation" as used herein is not intended to be limited to such patterns of movement but also includes back and forth motion between variable end points and/or for which there is no fixed central point. The terms "an oscillation" and "a single oscillation" as used herein therefore refers to a complete movement in a particular direction. For example, an oscillation comprises the movement in a particular direction that takes place between an immediately preceding change in direction and an immediately subsequent change in direction.

The term "oscillation speed" as used herein then refers to the speed or rate of the oscillation (i.e. the speed of movement during an oscillation). For example, for a fan assembly the oscillation of the air outlet typically involves rotation of the air outlet relative to an axis of rotation such that the speed at which the air outlet oscillates would then comprise the rotational or angular speed in radians or degrees per second. The term "oscillation magnitude" as used herein then refers to the size or extent of an oscillation. For example, for a fan assembly for which the oscillation of the air outlet involves rotation of the air outlet relative to an axis of rotation, the magnitude of the oscillation would then comprise the angle of oscillation/rotation, i.e. the angle through which the air outlet rotates during an oscillation. The term "oscillation frequency" as used herein then refers to the number of individual oscillations that occur within a period of time and can be given in hertz (Hz). The oscillation frequency is therefore defined by a combination of the oscillation speed and the oscillation magnitude of each oscillation.

In a preferred embodiment, the controller is arranged to randomly vary the oscillation speed of the air outlet for each oscillation. In particular, the controller is preferably arranged to randomly select the oscillation speed used for each oscillation from within a predefined range of oscillation speeds. By way of example, this predefined range of oscillation speeds could be defined by an upper oscillation speed limit and a lower oscillation speed limit such that the controller would then be arranged to randomly select an oscillation speed that is between the upper oscillation speed limit and the lower oscillation speed limit. By way of further example, the controller could be arranged to use a random number generator to select one of a range of values that all have an equal probability of being selected, and to then perform a lookup to identify an oscillation speed that corresponds with the randomly selected value. When using this approach the controller would preferably be configured to store or have access to a lookup table that contains an oscillation speed for each of the available values, with these oscillation speeds being separated by equally spaced intervals from a lower oscillation speed limit to an upper oscillation speed limit.

In an optional embodiment, the controller is arranged to vary both the oscillation speed and the oscillation magnitude for each oscillation of the air outlet. The controller could then be arranged to randomly vary the oscillation magnitude of the air outlet for each oscillation. In particular, the controller could be arranged to randomly select the oscillation magnitude used for each oscillation from within a predefined range of oscillation magnitudes. By way of example, this predefined range of oscillation magnitudes could be defined by an upper oscillation magnitude limit and a lower oscillation magnitude limit such that the controller would then be arranged to randomly select an oscillation magnitude that is between the upper oscillation magnitude limit and the lower oscillation magnitude limit.

In a preferred embodiment, the controller is configured to select the parameters for each oscillation (e.g. oscillation speed and oscillation magnitude) from predefined range(s) that correspond approximately to an oscillation frequency of from 0.15 Hz to 2 Hz, and preferably from 0.2 Hz to 1.5 Hz. In this regard, it has been found that the frequency range of human perception is typically from 0.15 Hz to 2 Hz whilst most perception is contained between 0.2 Hz and 1.5 Hz.

Figure 1:
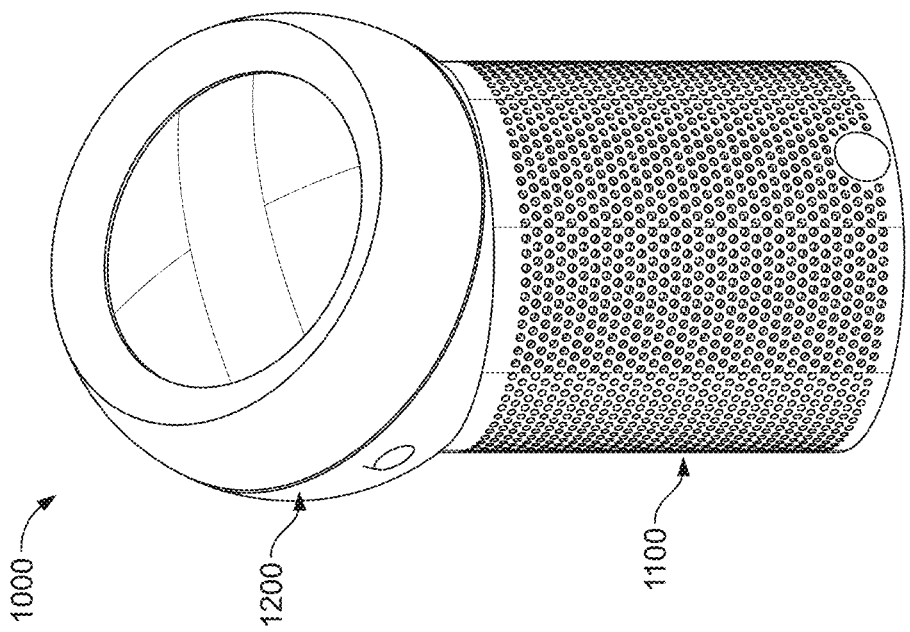
FIG. 1 is an isometric view of an embodiment of a fan assembly.
Figure 3:
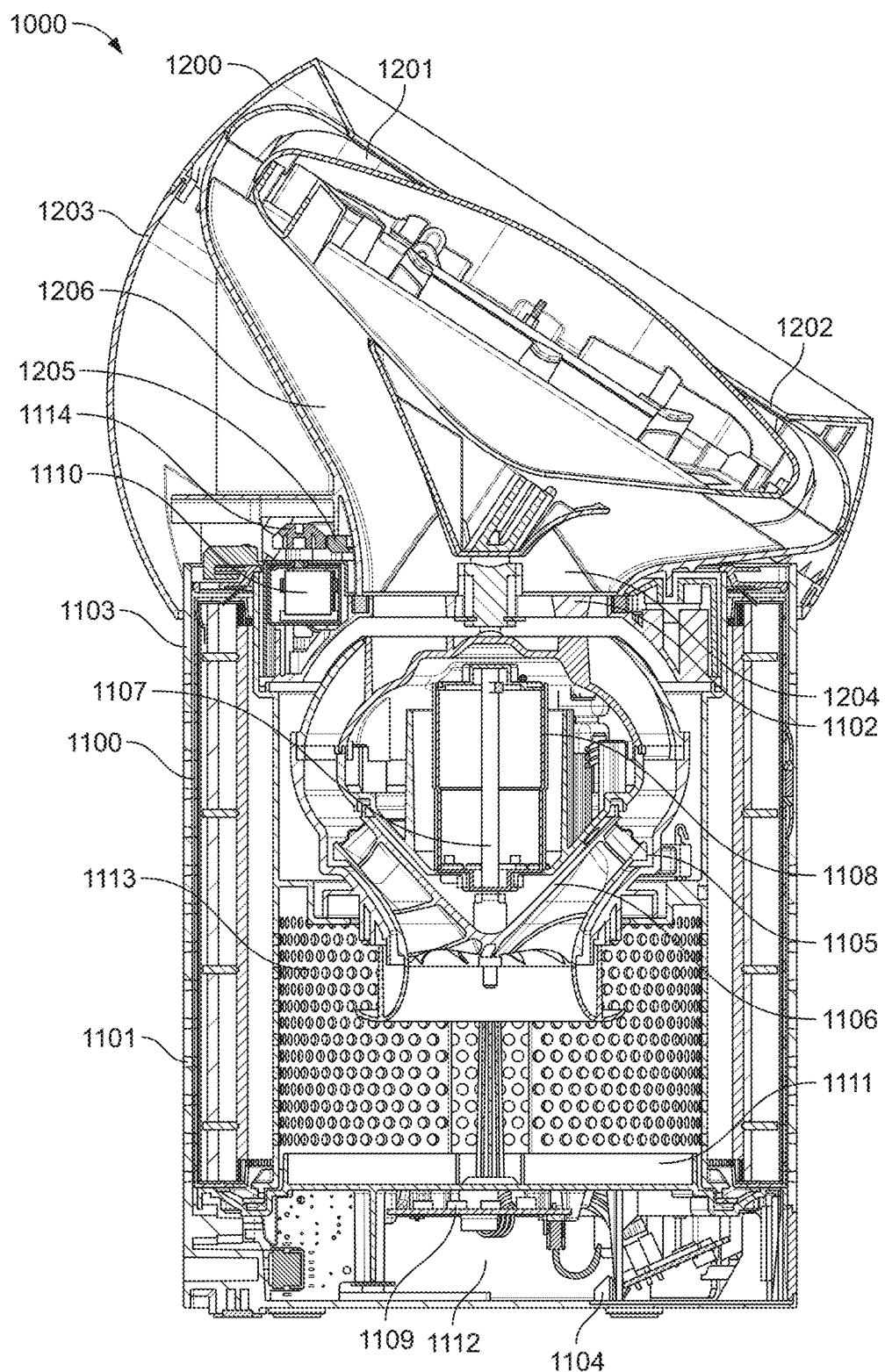
FIG. 3 is a sectional side view through the fan assembly of FIG. 1.

FIGS. 1 and 2 are external views of an embodiment of a fan assembly 1000 according to the present invention. FIG. 1 shows an isometric view of the fan assembly 1000 and FIG. 2 shows a front view of the fan assembly 1000. FIG. 3 then illustrates a sectional side view through the fan assembly 1000.

The fan assembly 1000 comprises a body or stand 1100 containing an air flow generator that is arranged to generate an air flow through the fan assembly 1000 and a nozzle 1200 mounted on the fan body 1100 that is arranged to emit the air flow from the fan assembly 1000. The fan body 1100 comprises an air inlet 1101 through which the air flow is drawn into the fan body 1100 by the air flow generator and an air outlet/vent 1102 downstream of the air flow generator for emitting the air flow from the fan body 1100 and into the nozzle 1200. The nozzle 1200 then comprises a first air outlet 1201 and a second air outlet 1202 that are each arranged to emit at least a portion of the air flow from the fan assembly 1000.

In the illustrated embodiment, the fan body 1100 comprises a cylindrical housing/casing 1103 having a side wall, a closed lower end and an open upper end. The air inlet 1101 of the fan body 1100 is then provided in the side wall of the casing 1103. In the illustrated embodiment, the air inlet 1101 into the body 1100 of the fan assembly 1000 comprises an array of apertures formed in the side wall of the outer casing 1103; however, the air inlet 1101 could alternatively comprise one or more grilles or meshes mounted within windows formed in the side wall. The closed lower end of the outer casing 1103 then provides a base 1104 (i.e. lower surface) upon which the fan assembly 1000 rests/is supported, whilst the open upper end provides the air outlet/vent 1102 through which the air flow is emitted from the fan body 1100 and into the nozzle 1200.

The air flow generator is disposed within the fan body 1100. In the illustrated embodiment, the air flow generator is provided by a motor-driven impeller that is housed within an impeller housing 1105 that is supported towards an upper end of the interior of the fan body 1100. In particular, the air flow generator comprises an impeller 1106 that is connected to a rotary shaft 1107 extending outwardly from a motor 1108. In the illustrated embodiment, the impeller 1106 is in the form of a mixed flow impeller and the motor 1108 is a DC brushless motor.

Various electronic components of the fan assembly 1000 are also disposed within the fan body 1100, including a controller 1109 that is configured to control various functions of the fan assembly 1000. In the illustrated embodiment, the controller 1109 comprises electronic components mounted on to a circuit board that has electronic interfaces with both an oscillation motor 1110 and the air flow generator. By way example, the electronic components of the controller 1109 could comprise a processor such as central processing unit or microprocessor and a memory. The memory could then comprise both primary storage, such as a random-access memory (RAM), that is directly accessible by the processor and secondary storage for any data, such as any computer programs/software applications implemented by the processor.

In the illustrated embodiment, the interior of the casing 1103 is separated into lower sections and upper sections by a platform 1111 disposed within the casing 1103 at the lower end of the casing 1103. The raised surface of the platform 1111 thereby divides the interior of the outer casing 1103 into upper and lower sections, with the lower section comprising that portion of the casing 1103 interior that is beneath the surface and the upper section comprising that portion that is above the surface. The lower section thereby provides a compartment 1112 within which various electronic components of the fan assembly 1000 are housed, including the controller 1109, with the platform 1111 forming a cover that sits over and separates the electronics from the rest of the fan assembly 1000, whilst the upper section provides a separate compartment 1113 within which the air flow generator is disposed and into which air enters through the air inlets of the fan body 1100.

Figure 4:
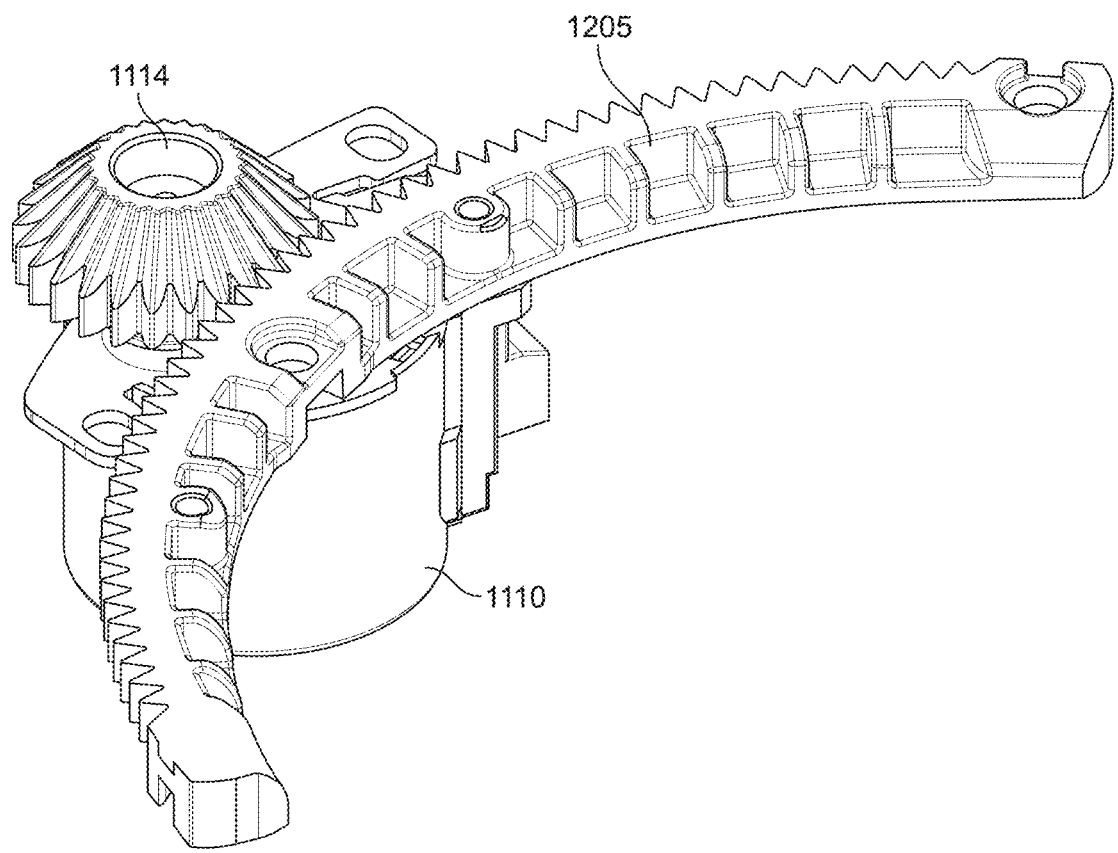
FIG. 4 is a perspective view of an embodiment of an oscillation mechanism.

The nozzle 1200 is then mounted on the fan body 1100 over the air outlet 1102 and is arranged to receive the air flow exhausted from the air outlet 1102 of the fan body 1100. The nozzle 1200 comprises a nozzle body 1203, an air inlet 1204 arranged to receive the air flow from the body 1100 of the fan assembly 1000 and a pair of air outlets 1201, 1202 that are arranged to emit the air flow from the fan assembly 1000. The fan assembly 100 then further comprises an oscillation mechanism for oscillating the nozzle body 1203 relative to the fan body 1100. The nozzle oscillation mechanism comprises an oscillation motor 1110 arranged to drive a drive member and a driven member that is arranged to be driven by the drive member to rotate around a rotation axis, wherein the driven member is provided on the nozzle body 1203 and both the oscillation motor 1110 and the drive member are provided on the body 1100 of the fan assembly 1000. FIG. 4 therefore shows a perspective view of a specific embodiment of the nozzle oscillation mechanism. In the illustrated embodiment, the drive member comprises a pinion 1114 and the driven member then comprises an arcuate rack or ring gear 1205, the rack 1205 comprising a set of teeth which mesh with teeth provided on the pinion 1114. Specifically, the drive member comprises a spur or straight-cut gear having radially projecting teeth that are straight and aligned parallel to the axis of rotation and the driven member comprises a spur or straight-cut rack having a plurality of radially projecting teeth that are straight and aligned parallel to the axis of rotation.

In the illustrated embodiment, the nozzle body 1203 has the general shape of a truncated sphere, with a first truncation forming a circular face of the nozzle 1200 and a second truncation forming a circular base of the nozzle 1200. The air inlet 1204 of the nozzle 1200 is then provided at the base of the nozzle 1200, whilst the first air outlet 1201 and the second air outlet 1202 are diametrically opposed on the face of the nozzle 1200. The nozzle 1200 then further comprises an internal air passageway 1206 within the nozzle body 1203 that extends between the air inlet 1204 and both the first and second air outlets 1201, 1202. The first outgoing airflow emitted from the first air outlet 1201 and the second outgoing airflow emitted from the second air outlet 1202 will therefore each comprise at least a portion of an incoming air flow that enters the nozzle 1200 through the air inlet 1204.

As described above, in the embodiment illustrated in FIGS. 1 to 4 the fan body 1100 comprises the base 1104 and the nozzle 1200 is arranged to be oscillated relative to the fan body 1100 such that the air outlets 1201, 1202 oscillate relative to the base 1204. The controller 1209 is therefore arranged to control the oscillation of the air outlets 1201, 1202 relative to the base 1104 by controlling the nozzle oscillation mechanism. In particular, the controller 1109 is arranged to control the oscillation motor 1110 that is arranged to drive the pinion 1114 that provides the drive member on the body 1100 of the fan assembly 1000. When controlling the nozzle oscillation mechanism the controller 1109 is configured to implement any one of four different oscillation modes, with the controller 1109 operating in one of these four modes in response to instructions received from a user of the fan assembly 1000 via a user interface. Specifically, the four oscillation modes comprise a stationary mode in which no oscillation occurs, a conventional oscillation mode in which the oscillation speed is constant for all oscillations, a first wind synthesis mode in which the oscillation speed varies between consecutive oscillations but in which the magnitude of oscillation is constant, and a second wind synthesis mode in which both the oscillation speed and the oscillation magnitude varies between consecutive oscillations. In particular, in both the first and second wind synthesis mode the controller 1109 is arranged to randomly vary the oscillation speed for each oscillation by randomly selecting the oscillation speed used for each oscillation from within a predefined range of oscillation speeds.

Figure 5:
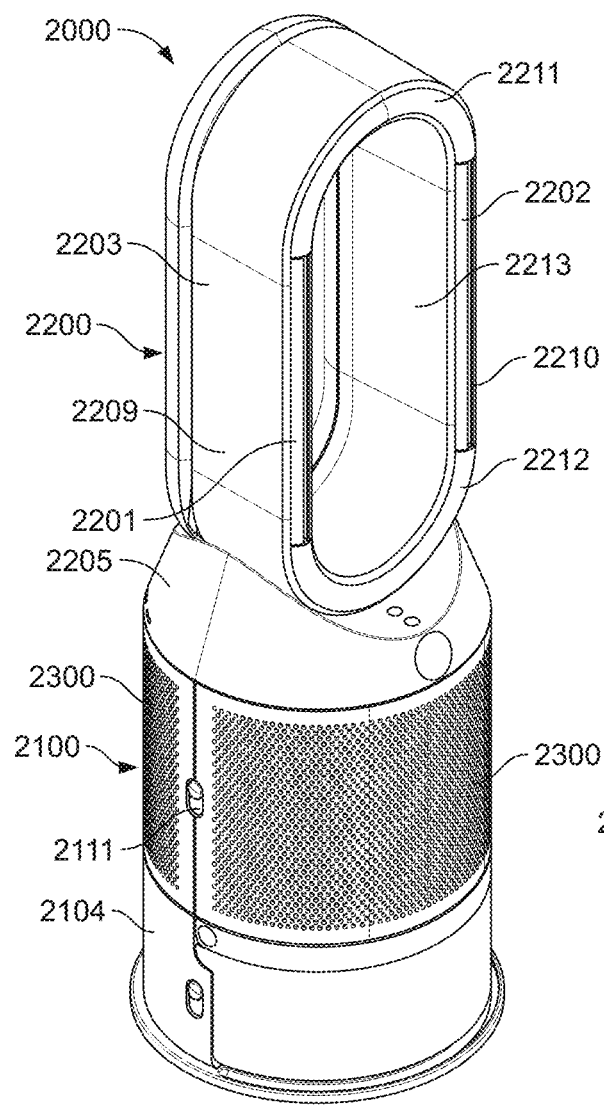
FIG. 5 is an isometric view of a further embodiment of a fan assembly.
Figure 6:
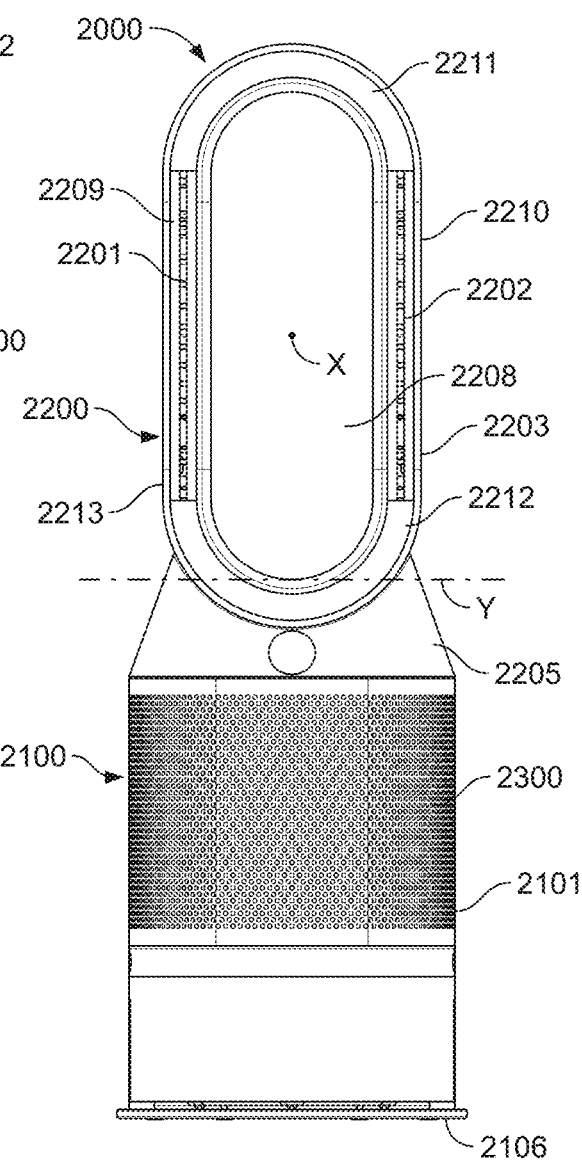
FIG. 6 is a front view of the fan assembly of FIG. 5.
Figure 7:
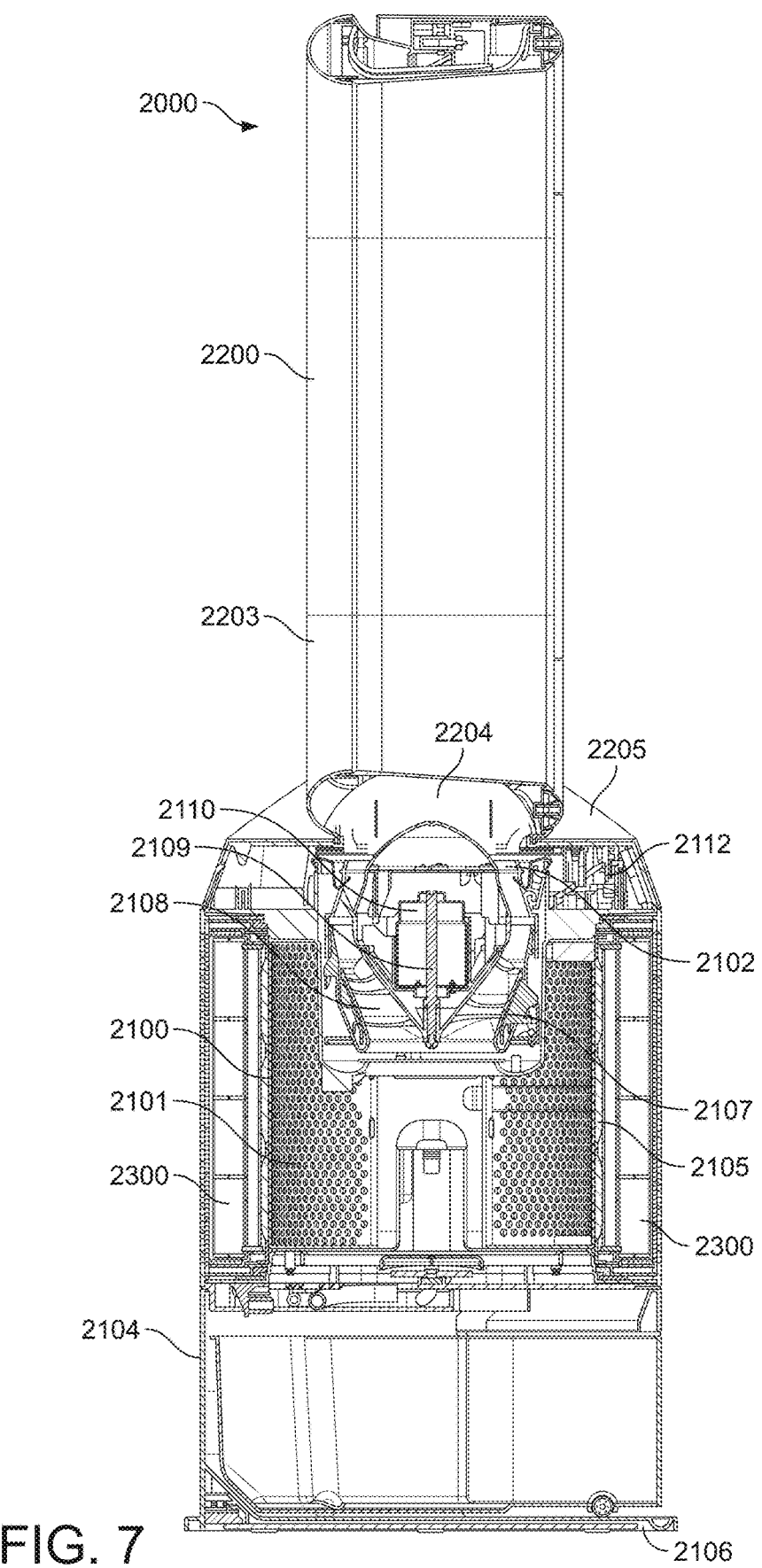
FIG. 7 is a sectional side view through the fan assembly of FIG. 5.

FIGS. 5 and 6 are external views of a further embodiment of a fan assembly 2000 according to the present invention. FIG. 5 shows an isometric view of the fan assembly 2000 and FIG. 6 shows a front view of the fan assembly 2000. FIG. 7 then illustrates a sectional side view through the fan assembly 2000.

The fan assembly 2000 comprises a body or stand 2100 containing an air flow generator that is arranged to generate an air flow through the fan assembly and a nozzle 2200 mounted on the fan body 2100 and which is arranged to emit the air flow from the fan assembly 2000. The fan body 2100 then comprises an air inlet 2101 through which the air flow is drawn into the body 2100 by the air flow generator and an air outlet/vent 2102 downstream of the air flow generator for emitting the air flow from the fan body 2100 and into the nozzle 2200. The nozzle 2200 then comprises a first air outlet 2201 and a second air outlet 2202 that are each arranged to emit at least a portion of the air flow from the fan assembly 2000.

In the illustrated embodiment, the body 2100 of the fan assembly 2000 comprises a substantially cylindrical upper body section 2103 mounted on a substantially cylindrical lower body section 2104. The upper body section 2103 of the fan assembly 2000 comprises a cylindrical housing/casing 2105 having a side wall. The air inlet 2101 into the body 2100 of the fan assembly 2000 then comprises an array of apertures formed in the side wall of the casing 2105. In the illustrated embodiment, the air inlet 2101 into the body 2100 of the fan assembly 2000 comprises an array of apertures formed in the side wall of the casing 2105; however, the air inlet 2101 could alternatively comprise one or more grilles or meshes mounted within windows formed in the side wall. The upper end of the upper body section 2103 then provides the air outlet/vent 2102 through which the air flow is emitted from the body 2100 and into the nozzle 2200, whilst a lower end of the lower body section 2104 provides a base 2106 upon which the fan assembly 2000 rests.

The air flow generator is disposed within the fan body 2100. In the illustrated embodiment, the air flow generator is provided by a motor-driven impeller that is housed within an impeller housing 2107 that is supported towards an upper end of the interior of the fan body 2100. In particular, the air flow generator comprises an impeller 2108 that is connected to a rotary shaft 2109 extending outwardly from a motor 2110. In particular, the impeller 2108 is in the form of a mixed flow impeller and the motor 2110 is a DC brushless motor. The upper body section 2103 of the fan assembly 2000 is also arranged to support removable filter assemblies 2300 upstream of the air inlet 2101 so that the air flow drawn through the air inlet 2101 by the motor-driven impeller is filtered prior to entering the body 2100 of the fan assembly 2000. The upper body section 2103 is then also provided with mechanisms 2111 for retaining and releasing the filter assemblies 2300 from the body 2100 of the fan assembly 2000.

The nozzle 2200 is then mounted on the fan body 2100 over the air outlet 2102 and is arranged to receive the air flow exhausted from the air outlet 2102 of the fan body 2100. The nozzle 2200 comprises a nozzle body 2203, an air inlet 2204 arranged to receive the air flow from the body 2100 of the fan assembly 2000 and a pair of air outlets 2201, 2202 that are arranged to emit the air flow from the fan assembly 2000. In the illustrated embodiment, the nozzle 2200 further comprises a neck/base 2205 that extends between the nozzle body 2203 and the upper end of the fan body 2100, with the external surface of the base 2205 of the nozzle 2200 being substantially flush with the outer edge of the upper body section 2103. The base 2205 of the nozzle 2200 therefore provides a housing that covers/encloses any components of the fan assembly 2000 that are provided on the upper surface of the fan body 2100. In particular, various electronic components of the fan assembly 2000 are disposed within the base 2205 of the nozzle 2000, including a controller 2112 that is configured to control various functions of the fan assembly 200. In the illustrated embodiment, the controller 2112 comprises electronic components mounted on to a circuit board that has electronic interfaces with the air flow generator and with each of the oscillation motors 2206, 2207. By way example, the electronic components of the controller 2112 could comprise a processor such as central processing unit or microprocessor and a memory. The memory could then comprise both primary storage, such as a random-access memory (RAM), that is directly accessible by the processor and secondary storage for any data, such as any computer programs/software applications implemented by the processor.

In the illustrated embodiment, the fan body 2100 comprises the base 2106 of the fan assembly 2000 and the nozzle body 2203 is fixed relative to the fan body 2100. The first air outlet 2201 and the second air outlet 2202 of the nozzle 2200 are then arranged to be oscillated relative to the nozzle body 2203 such that the air outlets 2201, 2202 oscillate relative to the base 2106. In particular, the first air outlet 2201 and the second air outlet 2202 are arranged to be independently rotated relative to the nozzle body 2203 such that a direction of the portion of the air flow emitted by each of the air outlets 2201, 2202 can be varied without rotating the nozzle body 2203 relative to the fan body 2100. The controller 2112 is therefore arranged to control the oscillation of the air outlets 2201, 2202 relative to the base 2106 of the fan assembly 2000 by independently controlling a first air outlet oscillation mechanism and a second air outlet oscillation mechanism. In particular, the controller 2112 is arranged to independently control a first oscillation motor 2206 that is arranged to rotate the first air outlet 2201 and a second oscillation motor 2207 that is arranged to rotate the second air outlet 2202.

In the illustrated embodiment, the nozzle body 2203 has an elongate annular shape, often referred to as a stadium or discorectangle shape, and defines a correspondingly shaped bore 2208 having a height (as measured in a direction extending from the upper end of the nozzle 2200 to the lower end of the nozzle 2200) greater than its width (as measured in a direction extending between the side walls of the nozzle 2200), and a central axis (X). The nozzle body 2203 therefore comprises two parallel, straight side sections 2209, 2210 each adjacent a respective elongate side of the bore 2208, an upper curved section 2211 joining the upper ends of the straight sections 2209, 2210, and a lower curved section 2212 joining the lower ends of the straight sections 2209, 2210.

In the illustrated embodiment, the nozzle body 2203 comprises an elongate annular casing 2213 that extends around the central bore 2208 of the nozzle 2200. The nozzle casing 2213 defines an interior passage 2214 that is arranged to convey air from the air inlet 2204 of the nozzle 2200 to the first and second air outlets 2201, 2202. The interior passage 2214 defined by the casing 2213 may be considered to comprise first and second sections which each extend in opposite directions about the inner bore 2208, as the air that enters the nozzle 2200 through the air inlet 2204 will enter the lower curved section 2212 of the nozzle body 2203 and be divided into two air streams which each flow into a respective one of the straight sections 2209, 2210 of the nozzle body 2203.

Each one of the parallel side sections 2209, 2210 of the nozzle body 2203 then forms a separate elongate, outlet section of the nozzle, with these outlet sections extending substantially along the whole length of the side sections 2209, 2210. Each outlet section then comprises a steerable/manoeuvrable air outlet 2201, 2202 that is arranged to emit a portion of the air flow from the nozzle 2200, with each of the air outlets 2201, 2202 being arranged to be independently rotated relative to the nozzle casing 2213. The nozzle 2200 therefore provides that the direction of the portion of the air flow emitted by each of the first and second air outlets 2201, 2202 can be varied without rotating the nozzle body 2203 relative to any portion of the fan body 2100.

Figure 8:
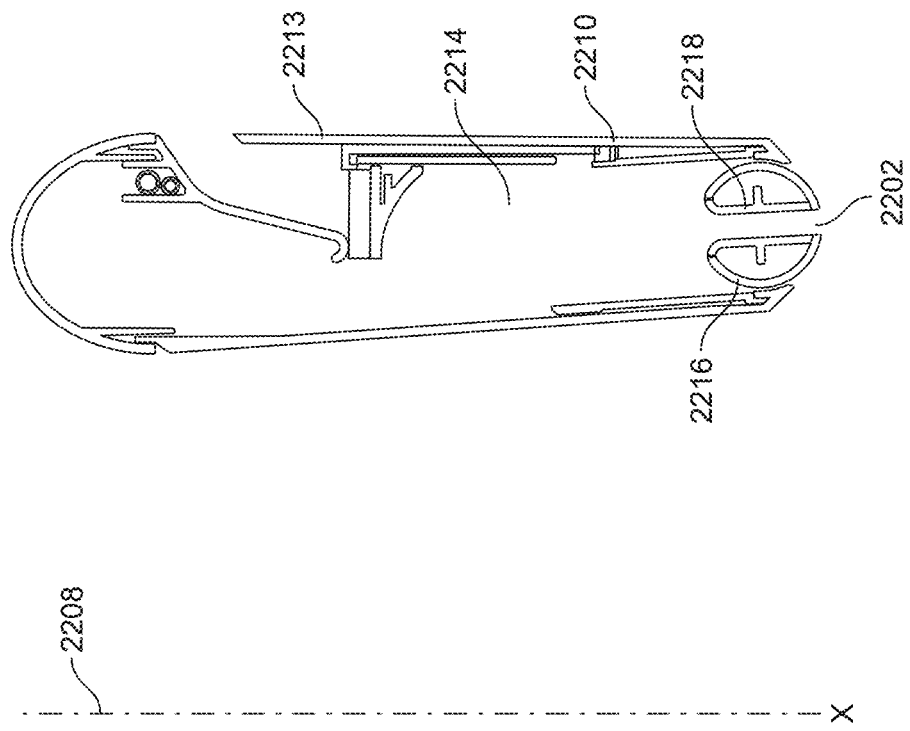
FIG. 8 is a top cross-sectional view through the nozzle of the fan assembly of FIG. 5.
Figure 8:
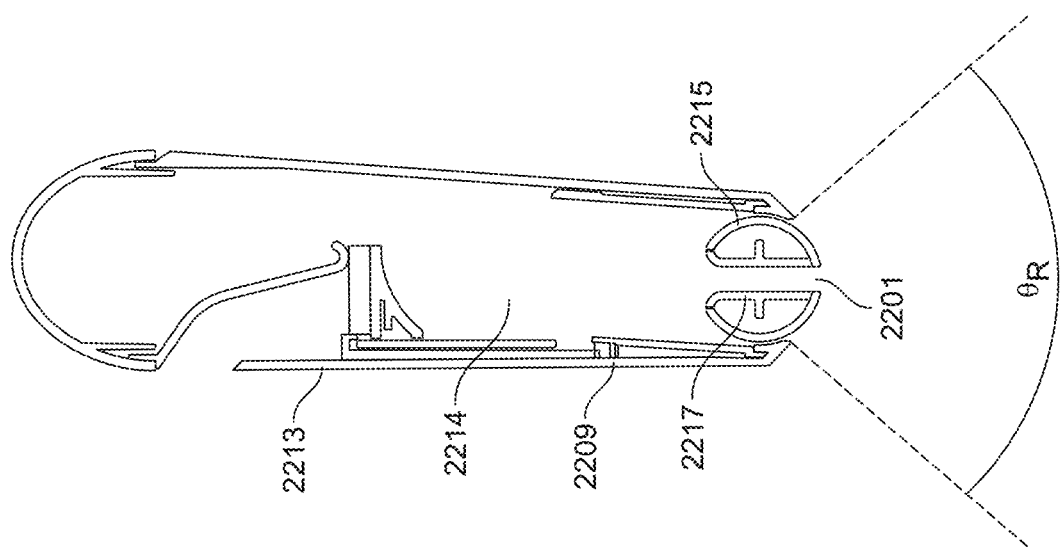

FIG. 8 is a top cross-sectional view through the nozzle 2200 of FIG. 5. In the illustrated embodiment, each of the first and second air outlets 2201, 2202 comprises an elongate, forward-facing opening defined by the corresponding outlet/side section of the nozzle body 2203 and a generally cylindrical, elongate exhaust/outlet body 2215, 2216 that is disposed within the opening and that is arranged to rotate within the opening around a longitudinal axis (Y) of the outlet body 2215, 2216. Each outlet body 2215, 2216 is then provided with an air outlet slot or channel 2217, 2218 that extends through the width of the outlet body 2215, 2216 and that therefore allows air to flow out of the nozzle 2200 through the outlet body 2215, 2216. Rotating each outlet body 2215, 2216 within the corresponding opening therefore changes the orientation of the corresponding air outlet channel 2217, 2218 relative to the nozzle body 2203 such that the air flow emitted through the outlet body 2215, 2216 also changes direction. Each of the first and second air outlets 2201, 2202 of the nozzle are therefore elongate, steerable and located on a respective elongate side of the central bore 2208 at the front of the nozzle 2200.

In the illustrated embodiment, the first and second air outlets 2201, 2202 each comprise an outlet body 2215, 2216 that is generally cylindrical, and therefore has a circular cross-section, and in which the air outlet channel 2217, 2218 is straight and extends diametrically through the outlet body 2215, 2216. These steerable air outlets 2201, 2202 are then arranged such that a portion of the curved outer surface of the outlet body 2215, 2216 projects outwardly through the corresponding opening in the side section 2209, 2210 of the nozzle body 2203, with an ingress end of the air outlet channel 2217, 2218 being provided on the portion of the outlet body 2215, 2216 that is disposed within the interior of the corresponding side section 2209, 2210 of the nozzle body 2203 and an egress end of the air outlet channel 2217, 2218 being provided on the portion of the outlet body 2215, 2216 that is exposed through the corresponding opening in the side section 2209, 2210 of the nozzle body 2203. The ingress end of the air outlet channel 2217, 2218 is then provided with a bell-mouth to assist with channeling air flowing within the interior passage 2214 of the nozzle 2200 into the air outlet channel 2217, 2218. Each of the steerable first and second air outlets 2201, 2202 is therefore arranged to have an oscillation range (OR) (i.e. a maximum oscillation magnitude) over which the air flow emitted from the nozzle 2200 through the corresponding outlet body 2215, 2216 can be varied.

FIG. 9 shows a side view of a specific embodiment of an outlet body and an outlet oscillation mechanism suitable for use with both the first and second air outlets 2201, 2202 of the fan assembly 2000 illustrated in FIGS. 4 to 7, whilst FIG. 10 shows an exploded view of the outlet body and outlet oscillation mechanism of FIG. 9. In the illustrated embodiment, one end of the elongate outlet body 2215, 2216 is attached to the shaft of an oscillation motor 2206, 2207 such that operation of the oscillation motor 2206, 2207 will cause the outlet body 2215, 2216 to rotate within the corresponding elongate opening in the side section 2209, 2210 of the nozzle body 2203. The opposite end of the outlet body 2215, 2216 is then disposed within a bearing 2219. The direction of the air flow emitted from the each of the steerable air outlets 2201, 2202 can therefore be varied by controlling the corresponding oscillation motor 2206, 2207 to adjust the angular orientation of the air outlet channel 2217, 2218. The controller 2112 is then arranged to independently control the first oscillation motor 2206 that is arranged to rotate the outlet body 2215 of the first air outlet 2201 and the second oscillation motor 2207 that is arranged to rotate the outlet body 2216 of the second air outlet 2202.

When controlling the first and second air outlet oscillation mechanisms the controller 2112 is configured to implement any one of four different oscillation modes, with the controller 2112 operating in one of these four modes in response to instructions received from a user of the fan assembly 2000 via a user interface. Specifically, the four oscillation modes comprise a stationary mode in which no oscillation occurs, a conventional oscillation mode in which the oscillation speed is constant for all oscillations, a first wind synthesis mode in which the oscillation speed varies between consecutive oscillations but in which the magnitude of oscillation is constant, and a second wind synthesis mode in which both the oscillation speed and the oscillation magnitude varies between consecutive oscillations. In particular, in both the first and second wind synthesis mode the controller 2112 is arranged to randomly vary the oscillation speed for each oscillation by randomly selecting the oscillation speed used for each oscillation from within a predefined range of oscillation speeds.

To operate the fan assembly 2000 the user presses button on a user interface. The user interface may be provided on the fan assembly 2000 itself, on an associated remote control (not shown), and/or on a wireless computing device such as a tablet or smartphone (not shown) that communicates with the fan assembly wirelessly. This action by the user is communicated to the controller 2112, in response to which the controller 2112 activate the fan motor 2110 to rotate the impeller 2108. The rotation of the impeller 2108 causes an air flow to be drawn into the fan body 2100 through the air inlet 2101 via the filter assemblies 2300. The user may control the speed of the fan motor 2110, and therefore the rate at which air is drawn into the body through the air inlet 2101, by manipulating the user interface. The air flow passes sequentially through the filter assemblies 2300, air inlet 2101, the impeller housing 2107 and the air vent 2102 at the open upper end of the body 2100 of the fan assembly 12000 to enter the interior passage 2214 of the nozzle 2200 via the air inlet 2204 located in the base 2205 of the nozzle 2200. Within the interior passage 2214, the air flow is divided into two air streams which pass in opposite angular directions around the bore 2208 of the nozzle 2200, each within a respective straight section 2209, 2210 of the nozzle body 2203. As the air streams pass through the interior passage 2214 air is emitted through both of the first air outlet 2201 and the second air outlet 2202.

It will be appreciated that individual items described above may be used on their own or in combination with other items shown in the drawings or described in the description and that items mentioned in the same passage as each other or the same drawing as each other need not be used in combination with each other. In addition, the expression "means" may be replaced by actuator or system or device as may be desirable. In addition, any reference to "comprising" or "consisting" is not intended to be limiting in any way whatsoever and the reader should interpret the description and claims accordingly.

Furthermore, although the invention has been described in terms of preferred embodiments as set forth above, it should be understood that these embodiments are illustrative only. Those skilled in the art will be able to make modifications and alternatives in view of the disclosure which are contemplated as falling within the scope of the appended claims. For example, those skilled in the art will appreciate that the above-described invention might be equally applicable to other types of environmental control fan assemblies, and not just free standing fan assemblies. By way of example, such a fan assembly could be any of a freestanding fan assembly, a ceiling or wall mounted fan assembly and an in-vehicle fan assembly.

In addition, whilst in the above described embodiments the fan assembly comprises a nozzle mounted on to a body of the fan assembly, this is not essential. In particular, in alternative embodiments one or more air outlets of the fan assembly could be provided on the body of the fan assembly such that no nozzle is necessary. The fan body would then be arranged to be oscillated relative to the base such that air outlet oscillates relative to the base. Similarly, whilst in the above described embodiments the fan body comprises the base of the fan assembly such that the fan body is fixed relative to the base, in alternative embodiments the fan body could be mounted to the base. The fan body may then be fixedly mounted to the base, with oscillation of any air outlet requiring either oscillation of the air outlet itself or oscillation of a nozzle comprising the air outlet. Alternatively, the fan body may then be arranged to oscillate relative to the base such that any air outlet provided on the fan body or on a separate nozzle also oscillates relative to the base.

Moreover, in each of the above described embodiments the fan assembly comprises a nozzle having two air outlets. However, in alternative embodiments the fan assembly could comprise just a single air outlet or more than two air outlets.

The invention claimed is:

1. A fan assembly comprising:
   a base arranged to support the fan assembly on a surface;
   an air flow generator that is arranged to generate an air flow;
   an air outlet that is arranged to emit at least a portion of the air flow from the fan assembly, wherein the air outlet is arranged to be oscillated relative to the base and air flow generator; and a controller that is arranged to control the oscillation of the air outlet relative to the base, wherein the controller is arranged to vary an oscillation speed of the air outlet for each oscillation.

2. The fan assembly of claim 1, wherein the controller is arranged to randomly vary the oscillation speed.

3. The fan assembly of claim 1, wherein the controller is arranged to randomly select the oscillation speed used for each oscillation.

4. The fan assembly of claim 3, wherein the controller is arranged to randomly select the oscillation speed used for each oscillation from within a range of oscillation speeds.

5. The fan assembly of claim 3, wherein the controller is arranged to randomly select the oscillation speed from between an upper speed limit and a lower speed limit.

6. The fan assembly of claim 1, wherein the controller is further arranged to vary an oscillation magnitude of the air outlet for each oscillation.

7. The fan assembly of claim 1, wherein the controller is configured with a plurality of oscillation modes, and when in at least one of the plurality of oscillation modes the controller is arranged to vary an oscillation speed of the air outlet for each oscillation.

8. The fan assembly of claim 7, wherein when in at least one other of the plurality of oscillation modes the controller is arranged to vary an oscillation speed and an oscillation magnitude of the air outlet for each oscillation.

9. The fan assembly of claim 7, wherein when in at least one other of the plurality of oscillation modes the controller is arranged to maintain the oscillation speed of the air outlet for each oscillation.

10. The fan assembly of claim 7, wherein when in at least one other of the plurality of oscillation modes the controller is arranged to keep the air outlet stationary.

11. The fan assembly of claim 1, wherein the fan assembly comprises two or more air outlets, and the two or more air outlets are arranged to be independently oscillated relative to the base and the air generator.

12. The fan assembly of claim 11, wherein the controller is arranged to independently vary an oscillation speed of each of the two or more air outlets for each oscillation.

13. The fan assembly of claim 12, wherein the controller is arranged to ensure that, for each oscillation, the oscillation speed of each of the two or more air outlets differs from that of the other of the two or more air outlets.

14. The fan assembly of claim 1, further comprising a further air outlet that is arranged to emit at least a portion of the air flow from the fan assembly, wherein the further air outlet is arranged to be oscillated relative to the base and the controller is arranged to control the oscillation of the further air outlet relative to the base.

15. The fan assembly of claim 14, wherein the controller is arranged to independently vary an oscillation speed of both the air outlet and the further air outlet for each oscillation.

16. The fan assembly of claim 15, wherein the controller is arranged to ensure that, for each oscillation, the oscillation speed of the air outlet differs from that of the further air outlet.

* * * * *